UNITED STATES PATENT OFFICE.

WILHELM WOLTERS, OF BOROWITSCHI, RUSSIA.

PROCESS OF CONCENTRATING SULFURIC ACID.

SPECIFICATION forming part of Letters Patent No. 514,983, dated February 20, 1894.

Application filed November 28, 1893. Serial No. 492,267. (No specimens.)

*To all whom it may concern:*

Be it known that I, WILHELM WOLTERS, chemist, a subject of the Emperor of Germany, residing at Borowitschi, in the government of Novgorod, in the Empire of Russia, have invented or discovered a new and useful Improvement in the Process of Making Sulfuric Acid, of which the following is a specification My invention relates to that class of well-known processes for manufacturing or producing sulfuric acid, in which the acid is concentrated in leaden vessels.

The object of my invention is to prevent the corrosion of such vessels by the acid; to which end my improvement consists in adding sulfate of lead to the acid during the process of concentration, in sufficient quantity to saturate the acid with said sulfate, and thus prevent it from attacking the leaden vessel.

The sulfate of lead is kept suspended in the liquid by agitating or stirring. The vapor resulting from the evaporation or concentration of the acid is conducted into leaden vessels and condensed therein. The lead sulfate dissolved in the acid by the heat separates therefrom on cooling, with the exception of a small portion. The separate lead sulfate may be repeatedly re-used in the concentrating vessels.

The apparatus by which my improved process is carried out is of usual well-known construction, and constitutes no part of the subject-matter claimed. It is therefore unnecessary to describe or illustrate it here.

The quantity of lead sulfate required to saturate the acid will necessarily vary somewhat, according to the condition or strength of the acid, but can readily be ascertained by experiment according to the well-known laws of chemical combination of such substances.

What I claim herein as new and of my own invention is—

The herein described process of concentrating sulfuric acid in leaden vessels, which consists in adding sulfate of lead to the acid during the process of concentration to prevent the acid from attacking the leaden vessel, substantially as described.

In testimony that I claim the foregoing as my invention I have signed my name in presence of two subscribing witnesses.

WILHELM WOLTERS.

Witnesses:
  EDWARD BILLA,
  CONSTANTIN BOBYLEFF.